United States Patent [19]
Liu

[11] 3,886,671
[45] June 3, 1975

[54] LINGUISTIC SELF LEARNING DEVICE

[75] Inventor: Hsing-Ching Liu, Taipei, China /Taiwan

[73] Assignees: Hsing-Ching Liu; Ching Huei Wei, both of Taipei, China /Taiwan

[22] Filed: May 2, 1974

[21] Appl. No.: 466,391

[52] U.S. Cl. .............. 35/35 C; 274/1 R; 274/42 P; 35/8 A
[51] Int. Cl. ..................... G09b 5/06; G11b 25/04
[58] Field of Search ............ 35/35 C, 8 A; 274/1 R, 274/1 A, 42 P

[56] References Cited
UNITED STATES PATENTS

| | | | |
|---|---|---|---|
| 1,946,318 | 2/1934 | Hamilton | 35/69 X |
| 2,886,646 | 12/1958 | Kindred | 274/1 R |
| 3,289,325 | 12/1966 | Shreck | 35/35 C |
| 3,383,114 | 5/1968 | Ryan | 35/8 A X |
| 3,477,140 | 11/1969 | Ryan et al. | 35/8 A |

FOREIGN PATENTS OR APPLICATIONS

| | | | |
|---|---|---|---|
| 850,696 | 10/1960 | United Kingdom | 274/42 P |

Primary Examiner—Wm. H. Grieb

[57] ABSTRACT

Linguistic self-learning device comprising mounted in a case a motor driven needle head attached to a loud speaker which is rocked in an arcuate path, the forward half cycle being actuated by the force transmitted from a motor through a clutch means, a limit-switch serving to open the circuit when the extremity of the forward half cycle is reached, and the return half cycle being completed by a return spring anchored to a clutch release rod. The said needle protrudes from the case through an arcuate slot and plays on a card having multi-sound recording tracks on one side and a corresponding picture on the other side, the card being selectively placeable on top of the needle to produce vocal effects of different languages. Pushing the releasing rod, disengages the clutch means to retract the needle head and return same to the starting position to enable repetitive playing.

12 Claims, 4 Drawing Figures

PATENTED JUN 3 1975

3,886,671

SHEET 1

PATENTED JUN 3 1975 3,886,871

SHEET 2

LINGUISTIC SELF LEARNING DEVICE

FIELD OF INVENTION

The present invention relates generally to a linguistic self-learning device, and more particularly to a device comprising mainly a needle-loud speaker unit movable in an arcuate path and a sound recording card having multi tracks on one side and a picture on the other side so as to enable a learner to be able to look at the picture and listen to the vocal effect of different languages selectively.

BACKGROUND OF INVENTION

Conventional educational aids for linguistic learning usually provide a disc record or recording tape to be listened together with a text book having the words and illustrations on it. The link between audio and visual effect is weak. Also, it is impossible to learn and compare at the same time several different languages.

To enhance and double the learning effect, a new device is therefore in great need. In addition, it is not simple for a conventional device to give repetitive performance.

SUMMARY OF INVENTION

Therefore the main object of the present invention is to provide a linguistic self-learning device having audio and visual effect at the same time, and also making it possible to place multi-languages on one record card.

Another object of the present invention is to provide a linguistic self-learning device which enables as many times of repetition as desired just by pushing a clutch rod.

A further object of the present invention is to provide a linguistic self-learning device that is self contained and compactly built at low cost so that every family can afford to get one as an educational toy.

Further objects and features of the present invention will become apparent from the following detailed description to be taken in conjunction with the accompanying drawings.

DETAILED DESCRIPTION OF PREFERRED EMBODIMENT

Figures 1, 2:
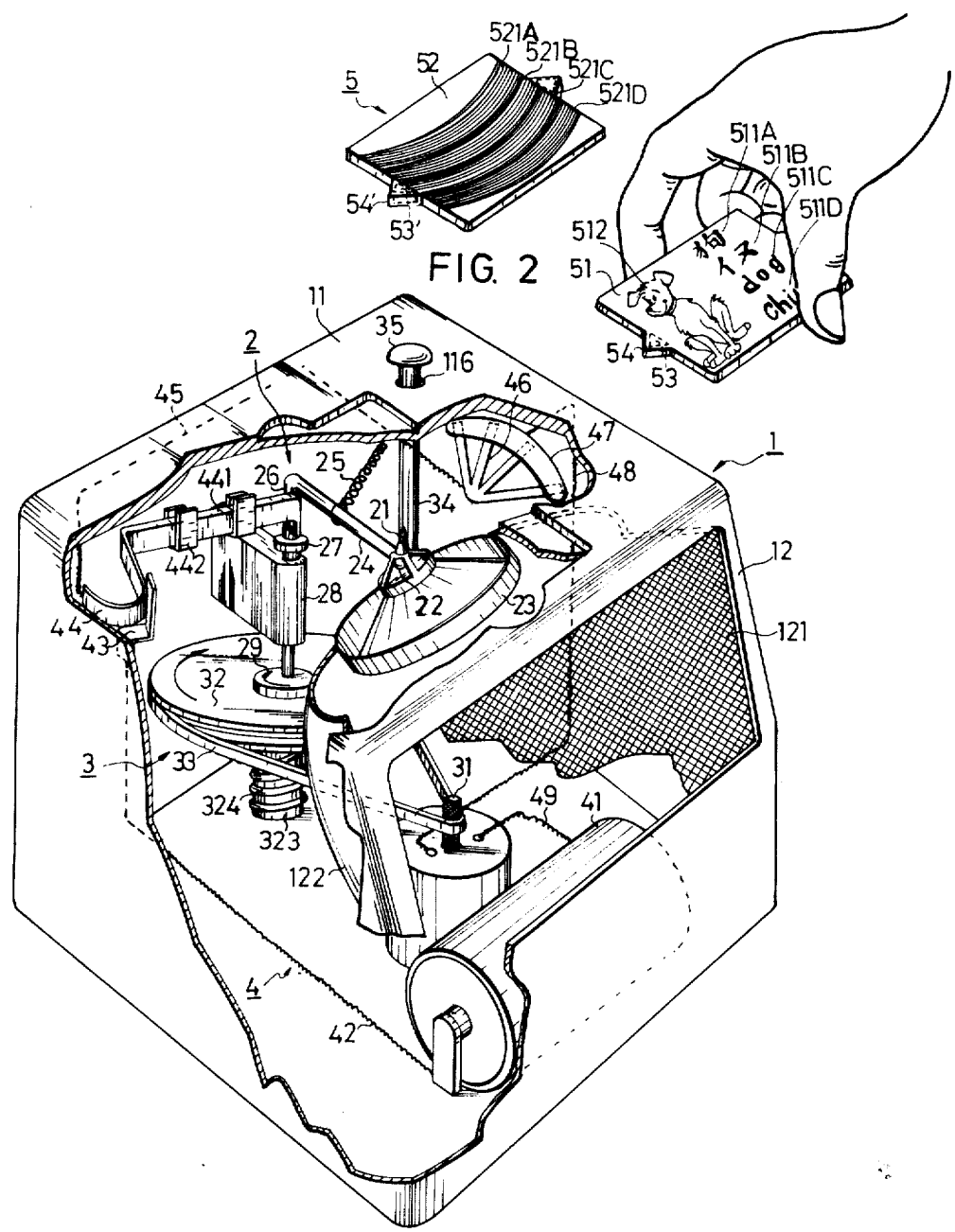
FIG. 1 is a perspective view of a preferred embodiment of the present invention.
FIG. 2 is a perspective view of the record card.

Referring to FIG. 1, the linguistic self learning device comprises a case 1, a playhead unit including a needle and a loud speaker assembly 2, a motor driving unit 3, an electric circuit 4, and a record card 5.

Figure 3:
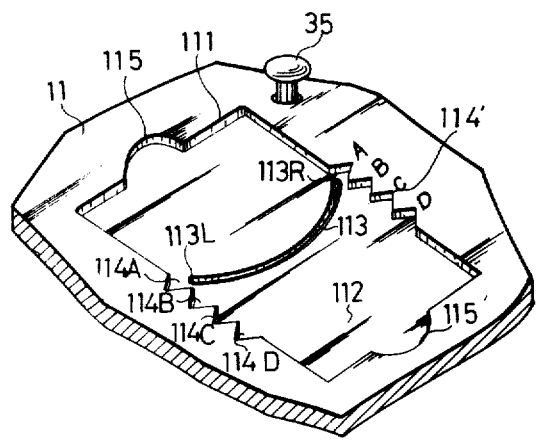
FIG. 3 shows the recess provided for taking the record card.

The cubic case 1 has a flat top 11 and an inclined front 12. At the center of top 11 a recess 111 is formed with an arc slot 113 on the bottom 112 of the recess. As shown in FIG. 3 the recess 111 also has at both left and right sides a plurality of zigzag cuttings 114A, B, C, D and 114'A, B, C, D to match side projections 54, 54' on the record card 5 which is shown in FIG. 2. The record card 5 has on its top side a picture. In example shown, a picture of a dog and a word corresponding to the picture in various languages say, Chinese, Japanese, English, French are shown beside the picture. On the back side 52 of the record card 5 sound tracks 521A, B, C, D are recorded with pronunciations of the word dog in Chinese, Japanese, English and French. Each of the four tracks 521A, B, C, D is multi-grooved with the same repetition of recording, so that when the card 5 is placed with any track in match with the slot 113 on the bottom 112 of recess 111, any small deviation of its position would still keep the needle 21 of the playhead unit 2 in contact from under the card 5 with one of the multi-grooves to give the sound effect. When side projection 54 is in match with cutting 114A, B, C, or D, selectivity of pronunciation in chinese, Japanese, English or French is provided. Concave portions 115 and 115' are provided at the upper and lower sides of the recess 111 for the convenient placing of the card 5.

On top of case 1 a hole 116 is provided for the projection of a push button 35 of a push rod 34 of a clutch assembly to be detailed later.

On the front inclination 12 of the case 1 a screened recess 121 is provided for the emergence of the sound which is amplified by a reflector 122 located at the back of screen 121 and in direct contact with the rim of the loud speaker 23 of the play head unit 2.

The playhead unit 2 comprises a needle 21 which protrudes from under the arc slot 113 under normal playing conditions and into contact with the sound track 521 under card 5. Under the needle 21 is a ball joint 22 through which a mechanical loud speaker 23 is swivelly connected. An L shaped shaft 26 having a horizontal end portion extended to form the said ball joint 22 and a vertical portion inserted into a vertical sleeve 28 with a stopper disc 27 formed near the upper end of the sleeve 28 at the lower end of the vertical portion of L shaft 26, is attached to a frictional disc for transmission of rotary motion from a big motor driven friction pulley 32. On the horizontal portion of L shaped shaft 26 a return spring 25 is connected and is anchored at push rod 34.

Now refer to the driving unit 3 which comprises an electric motor M having shaft 31. Through belt 33 the motion of shaft 31 is transmitted to the big friction pulley 32 which is normally in contact with the friction disc 29. The clockwise revolution of pulley 32 also imparts clockwise movement to the L shaped shaft 26 and causes the horizontal portion of shaft 26 to swing from right to left. In other words, the needle 21 travels in slot 113 from the right extremity 113R to the left extremity 113 L to play on track 521.

The electrical circuit of the device shall now be described. The circuit starts with positive end (+) of a dry cell 41, through wiring 42 to a contact pair 43–44; then through wiring 45 to a multi-prong forklike piece 46, a curved contact piece 47; then through wiring 48, motor M, and returns to the negative end (−) of the dry cell 41. The cell is replaceable through an access not shown in the figure.

Without card 5 being in recess 113 prongs A, B, C, D of contact piece 46 are open with respect to contact curve 47. Prongs 46A, B, C, D are both electric and magnetic conductive, so that when card 5 is placed inside recess 113 at whatever position selected a magnet 53' which is inserted in side projection 54' of card 5 attracts one of the prongs 46A, B, C or D under it to close with respect to the curve contact piece 47. Therefore no other switch is needed. Another magnet 53 is also inserted in projection 54 to enable the card to bear tightly against the bottom 112 of the recess 111 which is also magnetic conductive.

When the horizontal arm of shaft 26 moves to the left extremity 113L of the slot 113 the arm pushes open the switch member 44 of the switch pair 43–44 via a rod 441 slidably mounted on guides 442. The motor M then stops running and pulley 32 no longer gives momentum to the shaft 26 and needle 21 rests at the left extremity 113L of slot L.

Figure 4:
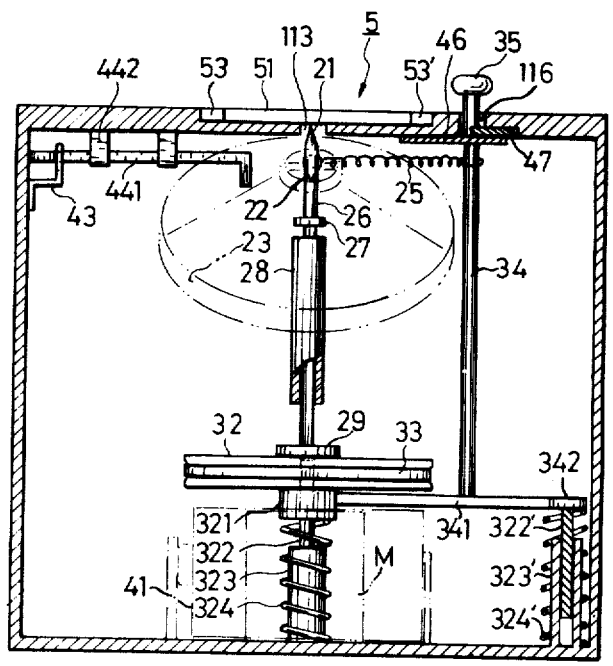
FIG. 4 is a sectional view taken from the back of the device to show the clutch means.

A clutch means is illustrated in FIG. 4 including a push rod 34 having at its upper end a push button 35 sticking out of a hole 116 at the top 11 of case 1. The lower end of the push rod 34 is connected to an equalizer bar 341 having one end coupled under pulley 32 to a spring seat 321. Pulley 32 is normally lifted upward by a spring 324 mounted around a bushing 323. A spindle 322 extends under spring seat 321 and is slidably inserted in the bushing 323. The other end of the bar 342 forms another spring seat. Spindle 322' extends downwardly through the center of another bushing 323' and a spring 324' having the same strength as spring 324 is mounted around the bushing 323' in a like manner as spring 324'. The lifting forces of springs 324 and 324' give a balanced uplift to the push rod 34. When the needle is at the left extremity 113L of slot 113 and button 35 is pushed down the springs 324–324' are depressed. Pulley 32 is thus lowered to disengage from friction disc 32 and vertical shaft 26 would then fall under gravity until the stopper 27 rests on the upper end of sleeve 28. At this time the horizontal arm of shaft 26 is free to return from the left extremity 113L to the right extremity 113R of the slot 113. In the meantime, switch pair 43–44 resumes closing under the return force of the spring contact piece 44. Of course, the switching pair 43–44 may be substituted with a normal-close limit switch and the clutch means be replaced with those varieties well known in the art. As soon as the circuit is reclosed the needle plays once more on the record.

It is to be noted that the returning force of spring 25 is always smaller than the friction force between pulley 32 and friction disc 29, so that the shaft 26 is capable of moving to effect the playing.

The device is capable of repetitive playing with successive pushing of the button 35. Various language pronunciations may be selected by placing the card 5 at the appropriate position.

The above embodiment is given only for illustrative purposes and not by way of limitation, and modifications will become evident to those skilled in the art which will fall within the scope of the attached claims.

I claim:

1. Linguistic self-learning device comprising a case, a recess on top of said case having cuttings therein, a record card to be played for insertion in said recess and having multi-track recording of a plurality of language pronunciations on one side and a picture and words of corresponding languages printed on the other side, said card having position selective projections to match desired ones of said cuttings, a playing unit in said case under said recess movable between first and second positions and having a needle movable in an arcuate slot in said recess, a spring biasing said unit to said second position, a loud speaker swivelly connected to said needle, a shaft connected to said needle, driving means for said shaft comprising an electric motor operatively connectable with a friction disc at the end of said shaft, manually operable clutch means operatively associated with said driving means, and an electric circuit including a limit switch for said motor biased to closed position, whereby when said card is inserted in said recess with said multi-track recording in position to be engaged by said needle and said clutch means is operated, said playing unit is moved to said second position by said spring and said limit switch is moved under its bias to closed position to commence a playing cycle, said playing unit then moving to said first position and said limit switch being operated to open position to open said circuit and complete the playing cycle.

2. Linguistic self-learning device according to claim 1, wherein the driving means has a forwarding friction force which is always greater than the spring returning force, so as to enable the playing unit to complete the playing cycle.

3. Linguistic self-learning device according to claim 1, wherein the record card has a magnet inserted in the position selective projections serving to tightly hold against the bottom of said recess as well as to attract a magnetic sensitive switch means to a closed position to keep the electric circuit normally closed as long as the card remains in the recess.

4. Linguistic self-learning device according to claim 3, wherein the magnetic sensitive switch means is comprised of a multi-prong fork-like contact and a curved contact.

5. Linguistic self-learning device according to claim 1, wherein the shaft is L shaped and rotatably mounted with its vertical portion inserted in a sleeve having at the end of its horizontal portion said needle and speaker, the latter being in contact with a reflector to amplify the sound.

6. Linguistic self-learning device according to claim 5, wherein said clutch means comprises a clutch push rod, said spring being connected to the horizontal portion of said L shaped shaft and anchored to said clutch push rod, and there is provided a stopper on the vertical portion of said shaft positioned to contact the top end of said sleeve.

7. Linguistic self-learning device according to claim 1, wherein the driving means further comprises a belt driven by the motor and connected to a friction pulley, motion being transmitted from the said pulley to the friction disc at the end of the shaft.

8. Linguistic self-learning device according to claim 7, wherein the clutch means comprises a clutch push rod having its upper end extending from the top of the said case as a push button and an equalizer bar connected to the lower end of the push rod with one end of the bar being connected to said pulley and adapted to decouple the pulley against an uplift spring unit and the other end of the bar being movable against another uplift spring unit.

9. Linguistic self-learning device according to claim 8, wherein the said uplift spring units comprise a bushing, a coil spring outside the bushing with one end bearing against the case and the other end retained under the end of said equalizer bar.

10. Linguistic self-learning device according to claim 3, wherein the electric circuit comprises a drycell, wiring from drycell to said limit switch, wiring from the limit switch to the multi-prong fork-like switch, wiring from the fork-like switch to the motor, and wiring from the motor to the dry cell.

11. Linguistic self-learning device according to claim 1, wherein the limit switch comprises a first contact and a spring biased second contact having a rod body slidably mounted in a guide means.

12. Linguistic self-learning device according to claim 1, wherein the sound track for each selective language has duplications of recording so that when the needle head under the card deviates from an exact position it will still be possible to pick up one of these duplications.

* * * * *